United States Patent Office 3,438,999
Patented Apr. 15, 1969

3,438,999
SECOTETRACYCLINE DERIVATIVES AND THEIR METHOD OF PREPARATION
John Samuel Paul Schwarz and Frank L. Weisenborn, Somerset, and Saul Lewis Neidleman, Lawrence Township, N.J., and Roland Walter Kinney, Berwyn, Pa., assignors to E. R. Squibb & Sons, Inc., New York, N.Y., a corporation of Delaware
No Drawing. Continuation-in-part of application Ser. No. 373,850, June 9, 1964. This application Jan. 27, 1966, Ser. No. 523,273
Int. Cl. C07d 5/00, 5/32; A61k 7/00
U.S. Cl. 260—343.3      10 Claims

ABSTRACT OF THE DISCLOSURE

New secotetracycline derivatives of the formulae:

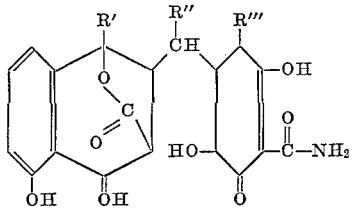

and

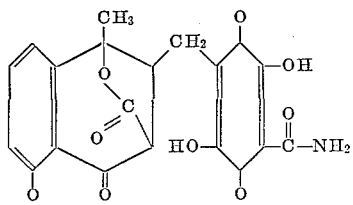

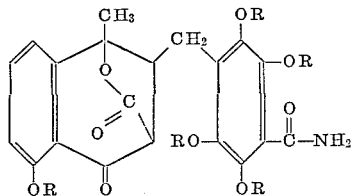

wherein R' is hydrogen or methyl, R" is hydrogen or hydroxy, R'" is hydrogen or dimethylamino, and R is the acyl radical of a hydrocarbon carboxylic acid of less than twelve carbon atoms, are disclosed. The compounds of the first two formulae possess strong ultraviolet absorption properties and the compounds of the last formula possess anti-androgenic activity.

This application is a continuation-in-part of our application, Ser. No. 373,850, filed June 9, 1964.

This invention relates to new chemical compounds and new processes for preparing chemical compounds, and, more particularly, to a new secotetracycline derivatives and new processes for preparing such derivatives and other known tetracycline derivatives.

The new compounds of this invention include: (a) lactone derivatives of secotetracyclines of the Formula I:

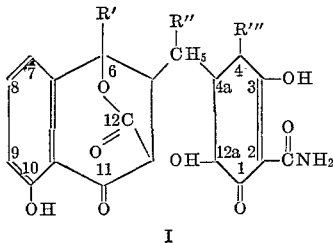

I wherein R' is hydrogen or methyl, R" is hydrogen or a hydroxy group, and R'" is hydrogen or dimethylamino; (b) 4-dedimethylamino-4-keto - 4a,12a-dehydro-12,12a-secotetracycline-12-oic acid 6,12-lactone of the Formula II:

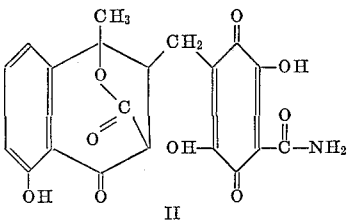

II and salts thereof; and (c) esters of 4-dedimethylamino-1-deoxy - 1,4 - dihydroxy - 1,4,4a,12a - tetradehydro-12,12a-secotetracycline-12-oic acid 6,12-lactone of the Formula III:

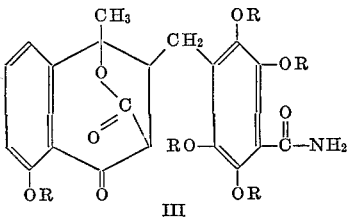

III wherein R is the acyl radical of a hydrocarbon carboxylic acid of less than twelve carbon atoms, such as the lower alkanoic acids (e.g., acetic, propionic butyric and enanthic acid), the monocyclic aryl(lower alkanoic) acids (e.g., phenylacetic acid and β-phenylpropionic acid), the monocyclic aryl carboxylic acids (e.g., benzoic acid and p-toluic acid), the lower alkenoic acids, the lower alkynoic acids, the cycloalkanecarboxylic acids and the cycloalkene carboxylic acids.

The new compounds of this invention of Formula I include: 4 - dedimethylamino - 12,12a-secotetracycline-12-oic acid 6,12-lactone, 4-dedimethylamino-5-hydroxy-12,12a-socotetracycline-12-oic acid 6,12-lactone, 4-dedimethylamino-6-demethyl - 12,12a - secotetracycline-12-oic acid 6,12-lactone, 12,12a-secotetracycline-12-oic acid 6,12-lactone and 5-hydroxy - 12,12a-secotetracycline-12-oic acid 6,12-lactone.

The new compounds of this invention of Formula II include: 4 - dedimethylamino - 4 - keto-4a,12a-dehydro-12,12a-secotetracycline-12-oic acid 6,12-lactone, and salts and esters thereof. Such salts include any salt with a non-toxic base; particularly, the alkali metal salts, such as the sodium and potassium salts, the alkaline earth metal salts, such as the calcium and magnesium salts, and salts with amines, such as the (lower alkyl) amines (e.g., methyl amine and ethyl amine) and the di(lower alkyl)amines (e.g., dimethylamine and diethylamine) and the tri(lower alkyl)amines (e.g., trimethylamine and triethylamine). The salts are formed by reaction with the hydroxyl groups in the 12a and/or 3-positions.

Those new compounds of this invention of Formulae I and II possess strong ultraviolet absorption properties, and so are ideally suited for use in sunburn preventive preparations, such as creams, lotions or oils, which are intended for topical application to filter out the ultraviolet radiation of natural sunlight. In addition, the new compound of this invention, 4-dedimethylamino-4-keto-4α,12α-dehydro-12,12α-secotetracycline-12-oic acid 6,12-lactone and its salts, are strongly colored compounds when viewed microscopically, possessing colors from red to yellow, can therefore be used as pigments for incorporation, together with a suitable vehicle such as linseed oil, for example, into artist's paints and colors.

Those new compounds of this invention of Formula III are physiologically active compounds possessing antiandrogenic activity and hence can be used in the treatment of acne, birsutism or the like for which purpose they are administered orally or parenterally to the patient, for example in conventional pharmaceutical dosage forms.

The new compounds of this invention of the Formulae I (wherein R''' is hydrogen) and II are prepared by subjecting tetracycline, 5-hydroxytetracycline or 6-demethyltetracycline under aerobic conditions to the action of the enzyme peroxidase in the presence of dihydroxyfumaric acid. The nature of the products formed will depend on the conditions under which the reaction is conducted, as more fully described hereinafter.

As sources of the peroxidase enzyme, plant cells and saps, animal tissues (such as liver), body fluids (such as saliva), leucocytes (myeloperoxidase), milk (lactoperoxidase) and many microorganisms may be used. The preferred sources of peroxidase for the purpose of this invention are horseradish and the microorganism, *Myrothecium verrucaria*. The peroxidase obtained from horse-radish can be supplied merely by pressing horse-radish and using the juice obtained or a purified preparation of horse-radish peroxidase may be used. The peroxidase from *M. verrucaria* can be obtained by culturing the microorganism on a suitable nutrient medium, recovering the mycelium formed and treating the mycelium to recover purified peroxidase.

In addition to the peroxidase, dihydroxyfumaric acid is also added to the reaction mixture. Although substantially any concentration of this compound may be used, preferably the dihydroxyfumaric acid is present in a molar ratio of about 68 to 1 to about 1030 to 1 (optimally about 480 to 1 to about 680 to 1) based on the weight of the tetracycline antibiotic. The reaction is preferably conducted at a pH in the range of about 3 to about 8 (optimally about 4.0 to about 6.0 and most advantageously at a pH of about 4.5). To assure that the pH of the reaction mixture is maintained in this range, a buffering agent which buffers in the desired pH range is preferably also added to the reaction medium. Suitable buffers include McIlvaine's buffer, potassium citrate buffer, potassium acetate buffer, potassium phosphate buffer and potassium formate buffer.

The reaction is carried out in an aqueous medium under aerobic conditions, normally at a temperature in the range of about 15° C. to about 95° C. (optimally about 22° C. to about 37° C.). The components of the medium, namely, the tetracycline, 5-hydroxytetracycline or 6-demethyltetracycline, buffering agent, peroxidase and dihydroxyfurmaric acid (preferably after adjustment of pH to the desired pH of the reaction medium, as by treatment with a base, such as potassium hydroxide) are merely mixed with water and the resultant mixture agitated or shaken to assure adequate aeration for about 10 to about 240 minutes (optimally about 30 minutes to about 120 minutes).

Although the peroxidase acts merely as a catalyst and hence can be present in any proportion, to assure maximum conversion of the starting tetracycline to the desired final products, the peroxidase is present in a weight ratio of about 0.1 to about 1.0 (optimally about 1.0) based on the tetracycline reactant.

A mixture of products is formed during the reaction which can be separated chromatographically as more fully described in the examples following. Among these products, the following are formed if tetracycline is employed as the tetracycline reactant: 4-dedimethylaminotetracycline, 5a-6-anhydrotetracycline, 5a,6-anhydro-4-dedimethylaminotetracycline, 4-dedimethylamino - 9 - hydroxytetracycline, 4 - dedimethylamino - 12,12a-secotetracycline - 12 - oic acid 6,12-lactone, 4-dedimethylamino - 4 - hydroxytetracycline, and 4-dedimethylamino-4 - keto - 4a,12a-dehydro-12,12a-secotetracycline-12-oic acid 6,12-lactone. If 5-hydroxytetracycline is employed as the tetracycline reactant, the following compounds are formed: the known compound, 4-dedimethylamino-5-hydroxytetracycline and the new compound, 4-dedimethylamino-5-hydroxy-12,12a-secotetracyline-12-oic acid 6,12-lactone. If 6-demethyltetracycline is employed as the tetracycline reactant, the following compounds are formed: 4-dedimethylamino-6-demethyltetracycline, 5a,6-anhydro-6-demethyletetracycline, 5a,6 - anhydro - 4 - dedimethylamino-6-demethyleteracycline, 4 - dedimethylamino - 6 - demethyl - 9 - hydroxytetracycline, 4-dedimethylamino-6 - demethyl - 12,12a-secotetracyline-12-oic acid 6,12-lactone, and 4-dedimethylamino-6-demethyl-4-hydroxytetracycline.

The esters of Formula III are prepared by reacting tetracycline with an oxidizing agent, such as mercuric acetate in the presence of an acylating agent, such as the anhydrides of the hydrocarbon carboxylic acids of less than twelve carbon atoms, as named hereinbefore, in a substantially non-aqueous solution or by reacting II or its salts with a reducing agent such as sodium hydrosulfite in the presence of an acylating agent, such as the anhydrides of the hydrocarbon carboxylic acids of less than twelve carbon atoms, as named hereinbefore, in a substantially non-aqueous solution.

The compounds of Formula I where R''' is dimethylamino can all be prepared chemically by treating tetracycline, 5-hydroxytetracycline or 6-demethyltetracycline with a base, such as a tertiary amine (e.g., a tri(lower alkyl)amine, such as triethylamine at an elevated temperature in an organic solvent (such as by refluxing in a dioxane solvent).

4 - dedimethylamino - 4 - keto - 4a,12a - dehydro - 12, 12a-secotetracycline-12-oic acid 6,12-lactone can also be prepared nonenzymatically from tetracycline by treatment with a peracid, such as m-chloroperbenzoic acid.

The following examples illustrate the invention (all temperatures being in centigrade):

Example 1

A reaction mixture of the following composition is prepared:

| | Component | Final Concentration |
|---|---|---|
| Volume, ml.: | | |
| 1.0 | McIllvaine's buffer, pH 4.5 (Handbook of Chemistry Physics, 35th ed. Chem. Rubber Publ. Co., Cleveland, Ohio, page 1617). | |
| 1.0 | Tetracycline hydrochloride | 500 μg./ml. |
| 1.0 | Horse-radish peroxidase (Worthington, Grade D). | 50 μg./ml. |
| 1.0 | Distilled water | |
| 1.0 | Dihydroxyfumaric acid (adjusted to pH 4.5 with potassium hydroxide). | 10.0 mg./ml. |

The reaction is initiated by the final addition of the enzyme. The mixture is incubated in a glass tube, 25 x 100 mm., at 25° on a rotary shaker with a 2-inch displacement at 280 cycles/minutes. At the end of 60 minutes, the reaction products are extracted from the aqueous solution into 1.0 ml. of ethyl acetate. The extract is analyzed by paper chromatography. Samples of 20 μl. are spotted on Whatman No. 1 paper buffered at pH 4.5 with 0.05 M potassium citrate and hydrated by dipping into an aqueous solution of 80% (v./v.) acetone and air-drying to evaporate the acetone. The chromatograms are developed descendingly with hexane:ethyl acetate, 1:1 (v./v.) at room temperature. After development the dried chromatograms are examined visually under an ultraviolet lamp (Mineralite Model SL, maximum emission at 254 mμ) to detect absorbing and fluorescing compounds. Spots are outlined, the chromatogram is then exposed momentarily to ammonia vapor and re-examined under ultraviolet light. Compounds with antibacterial activity are detected by bioautography in the usual manner using an overnight culture of *Staphylococcus aureus* strain 209P as test organism. The reaction products and some of their properties are listed in the following table. Under "Inhibitory Activity" a plus sign (+) indicates the compound possesses antibacterial activity and a minus sign (−) indicates the compound does not possess antibacterial activity against the test organism named above.

The result of this modification is an alteration in the number and relative concentration of the end products which accumulate. These are shown in the following table, wherein plus signs indicate an increase in quantity of the compound in question and a minus sign indicates no increase in quantity relative to Example 1 (the same let-

TABLE

| Product: | Rf | Inhibitory Activity | Fluorescence before NH₃ | Fluorescence after NH₃ | Identity |
|---|---|---|---|---|---|
| A | 0.78 | + | Orange | Green | 4-dedimethylaminotetracycline. |
| B | 0.68 | − | do | Orange | 4-dedimethylamino-12,12a-seco-tetracycline12-oic acid 6,12-lactone. |
| C | 0.68 | − | Blue-green | Blue-green | ?. |
| D | 0.81 | + | Orange | Red-orange | 5a,6-anhydrotetracycline. |
| E | 0.95 | + | Yellow-orange | Orange | 5a,6-anhydro-4-dedimethylaminotetracycline. |
| F | 0.38 | + | Orange | Green | 4-dedimethylamino-4-hydroxytetracycline. |
| G | 0.38 | − | Red | Red | 4-dedimethylamino-4-keto-4a,12a-dehydro-12,12a-seco-tetracycline-12-oic acid 6,12-lactone. |
| H | 0.22 | + | Absorbing | Absorbing | 4-dedimethylamino-9-hydroxytetracycline. |
| I | 0.57 | + | Orange | Green | ?. |
| J | 0.57 | − | Yellow | Orange | ?. |
| K | 0.26 | − | do | Yellow | ?. |
| L | 0.12 | − | Orange | Orange | ?. |
| M | 0.46 | − | Dull red | Dull red | ?. |
| N | 0.62 | − | Dull red-orange | Dull red-orange | ?. |
| O | 0.85 | − | Absorbing | Absorbing | ?. |

Compound B is isolated in pure crystalline form by preparative paper chromatography, subsequent countercurrent distribution in hexane-ethylacetate-methanol-water (4:4:3:4) (K=10), and crystallization from ethanol-water.

Properties of Compound B

| | |
|---|---|
| $[\alpha]_D^{20}$ | −60° (c. 0.6, methanol). |
| Elemental analysis | Anhydrous (calcd. from hydrate): C, 59.69; H, 4.66; N, 3.39; $C_{20}H_{19}O_8N$: C, 59.85; H, 4.77; N, 3.50. |
| IR (Nujol) | 5.65 (γ-lactone), sh. 6.03, 6.15, 6.36, 6.90 (6.90 band also present in CHCl₃ spectrum). |
| UV spectra (95% ethanol 0.1 N HCl). | 217 mμ (ε=16,600), 270 (21,700), 345 (4,600). |
| (Ethanolic 0.1 N NaOH). | 245 (19,700), 273 (15,900), 382 (6,800). |
| (Above after standing 0.5–2 hrs.). | 246 (22,900), 274 (18,700), 341 (7,600). |
| (Above after acidification). | 211 (20,900), 269 (19,800). |

Example 2

The reaction is carried out as in Example 1 with the exception that the original reaction mixture has been modified to have the following composition:

| Component | | Final Concentration |
|---|---|---|
| Volume, ml.: | | |
| 1.0 | Potassium citrate buffer, pH 5.0. | 0.1 M. |
| 1.0 | Tetracycline hydrochloride | 500 μg./ml. |
| 1.0 | Horse-radish peroxidase (Worthington, Grade D). | 50 μg./ml. |
| 1.0 | Potassium or ammonium formate. | 5.0 mg./ml. |
| 1.0 | Dihydroxyfumaric acid (adjusted to pH 5.0 with potassium hydroxide). | 10 mg./ml. | ters are used to indicate the compound as were used in the preceding table):

TABLE

| Product: | Stimulation due to added formate |
|---|---|
| A | +++ |
| B | ++++ |
| C | − |
| D | − |
| E | − |
| F | ++ |
| G | − |
| H | ++ |
| I | + |
| J | − |
| K | − |
| L | − |
| M | − |
| N | − |
| O | − |

Example 3

The reaction is carried out as in Example 1 with the exception that the original reaction mixture has been modified to have the following composition:

| Component | | Final Concentration |
|---|---|---|
| Volume, ml.: | | |
| 1.0 | Potassium acetate buffer pH 4.5. | 0.1 M. |
| 1.0 | Tetracycline hydrochloride | 500 μg./ml. |
| 1.0 | Horse-radish peroxidase (Worthington, Grade D). | 50 μg./ml. |
| 1.0 | Chloro-p-phenylenedimaine dihydrochloride. | 100 μg./ml. |
| 1.0 | Dihydroxyfumaric acid (adjusted to pH 4.5 with potassium hydroxide). | 10 mg./ml. |

The result of this modification is an alteration of the number and relative concentration of the end products which accumulate as compared to Example 1. These are shown in the following table:

TABLE

| Product: | Stimulation due to chloro-p-phenylene-diamine dihydrochloride |
|---|---|
| A | ++++ |
| B | ++ |
| C | − |
| D | − |
| E | − |
| F | − |
| G | − |
| H | +++ |
| I | +++ |
| J | − |
| K | − |
| L | − |
| M | − |
| N | − |
| O | − |

Example 4

The reaction is carried out as in Example 3 but substituting 1.0 ml. of potassium formate, at a final concentration of 0.1 M, for the potassium acetate buffer. This buffers the reaction medium at pH 4.0. The result of this modification as compared to Example 1 is shown in the following table:

TABLE

| Product: | Stimulation due to chloro-p-phenylene-diamine dihydrochloride and formate |
|---|---|
| A | ++++ |
| B | +++ |
| C | − |
| D | − |
| E | − |
| F | − |
| G | − |
| H | ++++ |
| I | +++ |
| J | − |
| K | − |
| L | − |
| M | − |
| N | − |
| O | − |

Example 5

The reaction is carried out as described in Example 2 except that a crude press junce of fresh horse-radish root is substituted for the partially purified peroxidase. Essentially the same results are obtained as were obtained in Example 2.

Example 6

The reaction is carried out as described in Example 1 with the exception that a highly purified preparation of horse-radish peroxidase is employed (Worthington Biochemical Corporation, grade A). Essentially the same results are obtained as were obtained in Example 1.

Example 7

To each of forty 500 ml. Erlenmeyer flasks is added 100 ml. of the following reaction mixture:

| | Component | Final Concentration |
|---|---|---|
| Volume, ml.: | | |
| 20 | 0.5 M Potassium formate buffer pH 4.0. | 0.1 M. |
| 25 | Distilled water | |
| 25 | Methanol | |
| 10 | Tetracycline hydrochloride | 500 µg./ml. |
| 10 | Dihydroxyfumaric acid (adjusted to pH 4 with KOH). | 5 mg./ml. |
| 10 | Horse-radish peroxidase (Worthington, Grade D). | 50 µg./ml. |

The flasks are shaken on a rotary shaker at 25° for 60 minutes, when the reaction is essentially complete. 4-hydroxy-4-dedimethylaminotetracycline and 4-dedimethylamino - 4-keto-4a,12a-dehydro-12,12a-secotetracycline-12-oic acid 6,12-lactone are formed. These are separated from each other and from unreacted substrate tetracycline in the manner described below.

The contents of the flasks are pooled and extracted with 500, 250 and 250 ml. portions of ethyl acetate. The ethyl acetate extracts are combined, dried with anhydrous sodium sulfate, filtered, then evaporated to dryness at a temperature less than 35° under reduced pressure. The dry weight of the orange-brown solid thus obtained is about 1.15 grams.

This material is further purified by column chromatography as follows: 500 g. Whatman Standard Grade Cellulose Powder is slurried with McIlvaine's buffer, pH 4.6, filtered and dried. The dried, buffered powder is hydrated by wetting with 80% aqueous actone and then aerating to remove the acetone. The moist powder is then suspended in n-hexane: ethyl acetate (2:1) and poured as a column 6.7 x 41 cm. The orange-brown solid obtained above (about 1.15 g.) is dissolved in hexane: ethyl acetate (2:1) and loaded onto the column, and elution with the same solvent is begun at the rate of 0.5 ml./min. with fractions collected every 20 minutes. Each fraction is analyzed chromatographically using Whatman No. 1 paper buffered at pH 4.6 with McIlvaine's buffer, developed with hexane:ethyl acetate (1:1). Fractions containing the products free of the unreacted substrate tetracycline are pooled, dried with anhydrous sodium sulfate, filtered, and concentrated to dryness under reduced pressure at 35°. About 258 mg. of a yellow powder is obtained. This yellow powder cannot be further purified in a satisfactory manner by chromatography, but is resolved into its two components by the following procedure.

The yellow powder is triturated with methanol to give a methanol-soluble and a methanol-insoluble fraction. The methanol-insoluble portion (41 mg.) proves to be pure 4 - dedimethylamino-4-keto-4a,12a-dehydro-12,12a-secotetracycline-12-oic acid 6,12-lactone, which possesses a mustard-yellow color.

The properties of the purified compound is listed below:

| Physical appearance | Mustard-yellow powder. |
|---|---|
| M.P. | 225.5–227.5° decomp. |
| $[\alpha]_D^{20}$ (methanol) | −74°±11°. |
| UV spectra($E^{1\%}$) (alc.) | 275 (543), 299 (459), sh. 337 (116), 422 (12). |
| (0.1 N HCl) | Sh. 244 (263), 274 (670), 295 (400), 338 (124). |
| (Nujol) | 2.95, 3.05, 5.62, 6.08, sh. 6.17, 6.30. |

Example 8

The reaction is carried out essentially as in Example 1 with the exception that a crude peroxidase preparation from the microorganism *Myrothecium verrucaria* ATCC 9095 (American Type Culture Collection, Washington, D.C.) is employed and the incubation temperature is 25°. The peroxidase is obtained by growing the microorganism for five days at 25° in a soybean meal-glucose medium of the following compositions:

| | G. |
|---|---|
| Archer-Daniels-Midland extracted soybean meal | 30 |
| Glucose | 50 |
| $CaCO_3$ | 7 |
| Distilled water, to make 1 liter. | |

The mycelium is recovered by filtration, dried with anhydrous acetone in the usual manner, and ground to a fine powder. The dry powder is stored in a dessicator at about 4° until immediately before use, when it is extracted with distilled water. The solution is used as the source of the enzyme. Essentially the same results are obtained as were obtained in Example 1.

Example 9

The reaction is carried out as in Example 8 except that the solution of the enzyme is partially purified by precipitation with ammonium sulfate. Powdered ammonium sulfate is added to the distilled water extract of the acetone powder of *M. verrucaria* to the point of 50% saturation. The protein precipitate which forms is collected by centrifugation, and is redissolved in water. This concentrated solution of protein can be used as such, or freed of residual ammonium sulfate by dialysis against water overnight at 4–6°. Essentially the same results are obtained as were obtained in Example 1.

Example 10

The compound 4 - dedimethylamino - 4 - keto-4a,12a-dehydro-12,12a-secotetracycline-12-oic acid 6,12-lactone can also be prepared by a nonenzymatic procedure as follows. Tetracycline is treated with m-chlorperbenzoic acid in dioxane at room temperature. For preparative purposes 1.6 moles m-chlorperbenzoic acid is reacted with 1 mole tetracycline in methanol. The mixture is allowed to stand at 24.5–26° until a starch-iodide test shows all the peracid to be consumed. The methanol is removed and the red, oily residue is extracted with several portions of boiling hexane. The residue is triturated with ethyl acetate to produce a brick-red powder. Isolation of the product through preparative paper chromatography and comparison with data of the product produced enzymatically shows them to be identical and establishes the identity as that of the compound named above.

Example 11

The reaction is carried out as in Example 1 except that 5-hydroxytetracycline is used in place of tetracycline as the substrate. The reaction products and some of their properties are listed in the following table. Under "Inhibitory Activity" a plus sign (+) indicates antibacterial activity against *Staphylococcus aureus* strain 209-P, and a minus sign (−) indicates that the compound does not possess antibacterial activity against this strain.

| | Rf | Inhibitory Activity | Fluorescence before $NH_3$ | Fluorescence after $NH_3$ | Identity |
|---|---|---|---|---|---|
| Product: | | | | | |
| P | 0.72 | + | Orange | Green | 4-dedimethyl-amino-5-hydroxy-tetracycline. |
| Q | 0.56 | − | do | Orange | 4-dedimethyl-amino-5-hydroxy-12,12a-seco-tetracycline-12-oic acid 6,12-lactone. |
| R | 0.90 | + | do | Green | ?. |
| S | 0.22 | + | do | Orange | ?. |
| T | 0.94 | − | do | do | ?. |
| U | 0.77 | − | do | do | ?. |
| V | 0.32 | − | do | do | ?. |

Example 12

The reaction is carried out as in Example 1 except that 6-demethyltetracycline is used in place of tetracycline as substrate. The reaction products and some of their properties are listed in the following table. Under "Inhibitory Activity" a plus sign (+) indicates antibacterial activity against *S. aureus* 209-P, and a minus sign (−) indicates that the compound does not possess antibacterial activity against this strain.

TABLE

| | Rf | Inhibitory Activity | Fluorescence before $NH^3$ | Fluorescence after $NH^3$ | Identity |
|---|---|---|---|---|---|
| Product | | | | | |
| A′ | 0.94 | + | Brown | Brown | 4-dedimethyl-amino-5a,6-anhydro-6-demethyltetracycline. |
| B′ | 0.89 | − | Dull rose | Dull rose | ?. |
| C′ | 0.83 | + | Yellow-orange | Orange | 5a,6-anhydro-6-demethyltetracycline. |
| D′ | 0.77 | + | Yellow-green | Green | 4-dedimethylamino-6-demethyltetracycline. |
| E′ | 0.70 | − | Pink | Pink | 4-dedimethylamino-6-demethyl-12,12a-seco-tetracycline-12-oic acid 6,12-lactone. |
| F′ | 0.65 | − | Orange | Orange | ?. |
| G′ | 0.59 | − | White | White | ?. |
| H′ | 0.51 | + | Rose | Green | 4-hydroxy-4-dedimethylamino-6-demethyltetracycline. |
| I′ | 0.39 | − | Pink | Pink | ?. |
| J′ | 0.35 | − | Absorbing | | ?. |
| K′ | 0.31 | − | Rose | Rose | ?. |
| L′ | 0.27 | + | Absorbing | | 4-dedimethylamino-6-demethyl-9-hydroxy-tetracycline. |
| M′ | 0.18 | − | White | Pink | ?. |
| N′ | 0.12 | − | Absorbing | Rose | ?. |
| O′ | 0.09 | − | Rose | do | ?. |

Example 13.—12,12a-secotetracycline-12-oic acid 6,12-lactone (Allotetracycline)

Tetracycline (11.3 g.) and triethylamine (4 ml.) are refluxed for 18 hours in 60 ml. of dioxane. The volatile components are removed by distillation under vacuum, and the residue is crystallized from acetone-benzene. The impure crystals are recrystallized from benzene to yield colorless needles of benzene solvate: yield about 5.55 g.

(42%), M.P. about 132–133°. The product is freed of the benzene by dissolving it in ethanol and precipitating it with water as an amorphous powder: M.P. about 132–133°; [α]$_D$+27° (MeOH); UV (alcohol), 260 mμ (ε—22,700), 340 mμ (ε—5000).

Analysis.—Calcd. for $C_{22}H_{24}O_8N_2$: C, 59.45; H, 5.44; N, 6.30. Found: C, 59.38; H, 5.44; N, 6.40.

Example 14.—5-hydroxy-12,12α-secotetracycline-12-oic acid 6,12-lactone (allo-oxytetracyline)

Oxytetracycline (1.35 g.) and triethylamine (0.5 ml.) are refluxed in 20 ml. of dioxane for 18 hours. The volatile components are removed by distillation under vacuum, and the residue is taken up in ethyl acetate. The bases are extracted with N hydrochloric acid and recovered from this extract by back extraction with ethyl acetate after the hydrochloric acid is neutralized. The basic function is placed on pre-wetted 3 MM paper buffered to pH 4.5 with McIlvaine's buffer, and the chromatograph is developed with 3:1 hexane-ethyl acetate. The blue-white fluorescing band is recovered from the paper and precipitated from ethanol by water. The resulting amorphous powder is crystallized twice from benzene to yield colorless needles of benzene solvate: yield about 33 mg. (2.4%); M.P. about 169–170°; [α]$_D$+85° (MeOH); UV (alcohol) 262 mμ (ε—23,000), 340 mμ (ε—5,700).

Analysis.—Calcd. for $C_{22}H_{24}O_9N_2 \cdot C_6H_6$: C, 62.42; H, 5.62; N, 5.20. Found: C, 62.35; H, 5.58; N, 5.40.

Example 15.—Monodimethylamine salt of 4-dedimethylamino-4-keto-4a,12a-dehydro-12,12a - secotetracycline-12-oic acid 6,12-lactone 4-dedimethylamino-4-keto - 4a,12a - dehydro - 12,12a-secotetracycline-12-oic acid 6,12-lactone (50 mg., 0.12 mmole) dissolved in 30 ml. of methanol is treated with 20 drops of dimethylamine. The solution turns light red but no precipitate forms. After concentration to ½ ml. the solution remains free of any precipitate. Upon addition of 4 drops of acetic acid together with a few seeds, the solution deposits dark red crystals: yield about 33 mg. (59%), decomposes without melting between 200 and 250°; UV (methanol) 273 mμ (ε, 19,200), 304 mμ (ε, 21,300), 514 mμ (ε, 690); IR (mineral oil mull) 2.93μ (s.), 3.03μ (w.), 3.62μ (m.), 4.06μ (m.), 5.61μ (s.), 6.08μ (s.), 6.22μ (w.).

Analysis.—Calcd. for $C_{22}H_{22}O_9N_2$: C, 57.64; H, 4.84; N, 6.11; N.E. 458. Found: C, 57.77; H, 4.49; N, 5.96; N.E. 458.

Example 16.—Monopotassium salt of 4-dedimethylamino-4-keto-4a,12a-secotetracycline-12-oic acid 6,12-lactone 4-dedimethylamino-4-keto - 4a,12a - dehydro - 12,12a-secotetracycline-12-oic acid 6,12-lactone (62 mg., 0.15 mmoles) and potassium acetate (20 mg., 0.20 mmoles) are dissolved at the boiling point in 25 ml. of methanol. The wine-red solution is concentrated to 3 ml. and 3 drops of glacial acetic acid are added. After having been seeded, the solution produces about 58 mg. of crystals. This crop is recrystallized once from methanol to yield about 40 mg. (55%) of orange crystals of methanol solvate. On drying at 100° for 2 hours the methanol is driven off and the crystals become deep red. The infrared spectrum of this solvate is identical to that of the analytical sample. The latter is prepared by further crystallization from methanol: no melting point, UV (methanol) 268 mμ (ε, 17,900), 301 mμ (ε, 20,500), 494 mμ (ε, 740); IR (mineral oil mull) 2.89μ (m.), 3.07μ (m.), 5.67μ (s.), 6.09μ (s.), 6.28 (s.).

Analysis.—Calcd. for $C_{20}H_{14}O_9NK \cdot CH_3OH$: T.V. 7.57. Found: T.V. 7.76. Calcd. for $C_{20}H_{14}O_9NK$: K, 8.66; N, 3.10. Found: K, 8.76; N, 2.96.

Example 17.—12a,3-dipotassium salt of 4-dedimethylamino-4-keto-4a,12a-dehydro - 12,12a-secotetracycline-12-oic acid 6,12-lactone 0.100 g. (0.218 mmole) of the monodimethylamine salt formed in Example 15 and potassium acetate (0.186 g., 1.90 mmoles) are refluxed for 30 minutes in 100 cc. of methanol. At the end of this time the volume is reduced to 20 cc. After the mixture has cooled the orange, amorphous precipitate is filtered: yield about 74 mg. (69%). An infrared spectrum shows this to be essentially pure. TThe analytical sample is prepared by reprecipitating the sample from methanol.

Analysis.—Calcd. for $C_{20}H_{13}O_9NK_2$: K, 15.97, N—$CH_3$, 0. Found: K, 14.28; N—$CH_3$, 0.

Example 18.—4-dedimethylamino-1-deoxy-1,4-dihydroxy-1,4,4a,12a-tetrahydro-12,12a-secotetracycline - 12 - oic acid 6-12-lactone pentaacetate Tetracycline (1.00 g., 2.25 mole) in 3 ml. of glacial acetic acid and mercuric acetate (2.00 g., 6.27 mmoles) in 32 ml. of the same solvent are mixed and the solution allowed to stand under nitrogen for one hour. During the time a copious precipitate of mercurous acetate forms. At this time potassium acetate (fused, 0.7 g., 7 mmoles) and 50 ml. of acetic anhydride are added, and the resulting mixture is then stirred magnetically for 7 days under nitrogen. The mixture is treated with excess hydrogen sulfide, and the precipitate is removed by filtration through Celite. The filtrate is evaporated under vacuum at 50°. The resulting oil is treated with water and, after 3 hours, the green powder formed is collected on a filter. The dried powder (1.27 g.) is crystallized from methanol several times. Second and third crops are taken and recrystallized as needed. The pure samples are combined to give a total yield of about 410 mg. (34%), M.P. (e.c.) soften 197°, melt 200–202°. The infrared of this product is identical with that of the analytical sample prepared by further crystallization from methanol: M.P. (e.c.) 201.5–202.5°; [α]$_D^{20}$—24.5° (c., 0.47, methanol); UV (95% ethanol) 271 mμ (ε, 8,000), 343 mμ (ε, 4,500); IR (Nujol) 3.05–3.13 (w.), 5.58μ (s.), 5.80μ (m.), 5.86μ (s.), 6.05μ (m.), 6.15μ (m), 6.30μ (w.).

Analysis.—Calcd. for $C_{30}H_{27}O_{14}N$: C, 57.60; H, 4.35; OAc, 34.40. Found: C, 57.90; H, 4.34; OAc, 34.44.

What is claimed is:

1. A compound of the formula

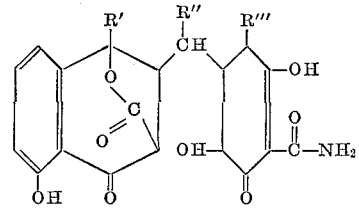

wherein R' is selected from the group consisting of hydrogen and methyl, R" is selected from the group consisting of hydrogen and hydroxy, and R''' is selected from the group consisting of hydrogen and dimethylamino.

2. 4-dedimethylamino-5-hydroxy - 12,12a - secotetracycline-12-oic acid 6,12-lactone.

3. 4-dedimethylamino-12,12a-secotetracycline - 12 - oic acid 6,12-lactone.

4. 4-dedimethylamino-6-demethyl - 12,12a - secotetracycline-12-oic acid 6,12-lactone.

5. Allotetracycline.

6. Allooxytetracycline.

7. A compound selected from the group consisting of 4-dedimethylamino-4-keto-4a,12a-dehydro - 12,12a - secotetracycline-12-oic acid 6,12-lactone and salts thereof.

8. 4-dedimethylamino-4-keto-4a,12a - dehydro - 12,12a-secotetracycline-12-oic acid 6,12-lactone.

9. A compound of the formula
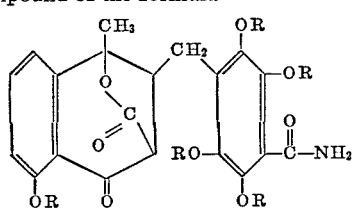
wherein R is the acyl radical of a hydrocarbon carboxylic acid of less than twelve carbon atoms.
10. 4-dedimethylamino-1-deoxy-1,4-dihydroxy - 1,4,4a, 12a-tetrahydro-12,12a-secotetracycline-12 - oic acid 6,12-lactone pentaacetate.
No references cited.
ALEX MAZEL, *Primary Examiner.*
J. A. NARCAVAGE, *Assistant Examiner.*
U.S. Cl. X.R.
106—288; 260—559; 424—60, 279

UNITED STATES PATENT OFFICE
CERTIFICATE OF CORRECTION

Patent No. 3,438,999　　　　　　Dated　April 15, 1969

Inventor(s)　John Samuel Paul Schwarz et al.

It is certified that error appears in the above-identified patent and that said Letters Patent are hereby corrected as shown below:

Column 1, first formula, that portion of the formula reading

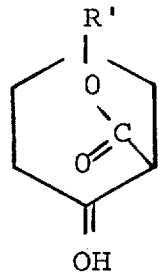　　　should read　　　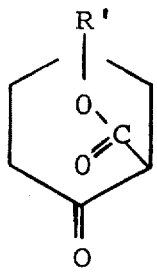

and in the second formula

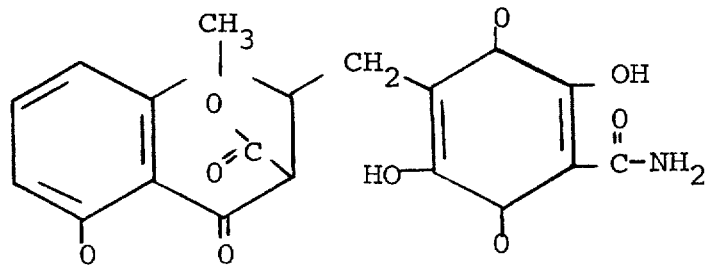　　　should read

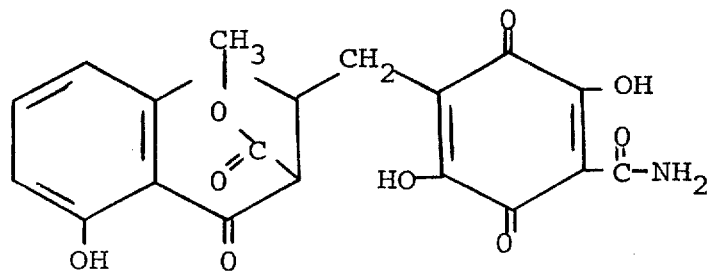

PO-1050
(5/69)

UNITED STATES PATENT OFFICE
CERTIFICATE OF CORRECTION

Patent No. 3,438,999         Dated April 15, 1969

Inventor(s) John Samuel Paul Schwarz et al.

It is certified that error appears in the above-identified patent and that said Letters Patent are hereby corrected as shown below:

Column 4, line 8, "demethyletetracycline" should read -- demethyltetracycline --; and line 9, "demethyleteracycline" should read -- demethyltetracycline --.

Column 6, line 68, "Worthington$^5$" should read -- Worthington, --.

Column 7, line 51, "junce" should read -- juice --.

Column 8, line 19, "actone" should read -- acetone --.

Column 11, line 8, "12α" should read -- 12a --.

Column 12, line 11, "TThe" should read -- The --.

SIGNED AND
SEALED
JUL 21 1970

(SEAL)
Attest:

Edward M. Fletcher, Jr.
Attesting Officer

WILLIAM E. SCHUYLER, JR.
Commissioner of Patents